(12) United States Patent
Zeng et al.

(10) Patent No.: US 9,542,846 B2
(45) Date of Patent: Jan. 10, 2017

(54) REDUNDANT LANE SENSING SYSTEMS FOR FAULT-TOLERANT VEHICULAR LATERAL CONTROLLER

(75) Inventors: Shuqing Zeng, Sterling Heights, MI (US); Jeremy A. Salinger, Southfield, MI (US); William J. Chundrlik, Jr., Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1235 days.

(21) Appl. No.: 13/036,538

(22) Filed: Feb. 28, 2011

(65) Prior Publication Data

US 2012/0221168 A1 Aug. 30, 2012

(51) Int. Cl.
| | |
|---|---|
| *G08G 1/16* | (2006.01) |
| *G08G 1/0962* | (2006.01) |
| *B60W 30/12* | (2006.01) |
| *B60W 30/16* | (2012.01) |

(52) U.S. Cl.
CPC .............. *G08G 1/167* (2013.01); *B60W 30/12* (2013.01); *B60W 30/16* (2013.01); *G08G 1/09626* (2013.01); *G08G 1/16* (2013.01); *B60W 2420/42* (2013.01); *B60W 2550/146* (2013.01); *B60W 2550/30* (2013.01); *B60W 2550/402* (2013.01)

(58) Field of Classification Search
USPC ...... 701/23, 36, 41, 43, 29.7, 466, 518, 534; 382/104, 107
See application file for complete search history.

(56) References Cited

U.S. PATENT DOCUMENTS

| | | | |
|---|---|---|---|
| 5,617,085 A * | 4/1997 | Tsutsumi et al. .............. | 340/903 |
| 6,487,477 B1 * | 11/2002 | Woestman .............. | B60L 11/14 |
| | | | 701/524 |
| 6,580,986 B1 * | 6/2003 | Uenuma et al. ................. | 701/41 |
| 7,184,073 B2 * | 2/2007 | Varadarajan et al. ........ | 348/148 |
| 7,216,023 B2 * | 5/2007 | Akita .............................. | 701/41 |
| 7,400,236 B2 * | 7/2008 | Kade et al. ...................... | 701/41 |
| 7,426,437 B2 * | 9/2008 | Breed ..................... | G01C 21/26 |
| | | | 701/301 |
| 7,542,840 B2 * | 6/2009 | Kawakami et al. ............ | 701/93 |
| 8,605,947 B2 | 12/2013 | Zhang | |
| 2005/0131642 A1 * | 6/2005 | Adachi ................... | G01C 21/26 |
| | | | 701/300 |
| 2009/0088966 A1 * | 4/2009 | Yokoyama et al. .......... | 701/201 |
| 2010/0082195 A1 * | 4/2010 | Lee et al. ........................ | 701/25 |
| 2010/0246889 A1 * | 9/2010 | Nara et al. ..................... | 382/104 |
| 2010/0292895 A1 * | 11/2010 | Nakamura et al. ............. | 701/41 |
| 2010/0299000 A1 * | 11/2010 | Nakamura et al. ............... | 701/1 |

* cited by examiner

*Primary Examiner* — Dale Hilgendorf
(74) *Attorney, Agent, or Firm* — John A. Miller; Miller IP Group, PLC

(57) ABSTRACT

A vehicle lateral control system includes a lane marker module configured to determine a heading and displacement of a vehicle in response to images received from a secondary sensing device, a lane information fusion module configured to generate vehicle and lane information in response to data received from heterogeneous vehicle sensors and a lane controller configured to generate a collision free vehicle path in response to the vehicle and lane information from the lane information fusion module and an object map.

13 Claims, 5 Drawing Sheets

REDUNDANT LANE SENSING SYSTEMS FOR FAULT-TOLERANT VEHICULAR LATERAL CONTROLLER

BACKGROUND

1. Field of the Invention

This invention relates generally to a vehicle lateral control system and, more particularly, to a system and method for providing limited vehicle stability control when the primary lateral control sensing device fails.

2. Discussion of the Related Art

An emerging technology in the automotive industry is autonomous driving. Vehicles having autonomous capabilities are able to perform a variety of tasks without assistance from a driver. These tasks, which include the ability to control speed, steering and/or lane changing, are generally implemented by a vehicle lateral control system configured to receive sensing information from a primary sensing device such as a forward looking lane sensing camera. However, in these single sensor arrangements, the forward looking camera becomes a single-point-of-failure that renders the vehicle's lateral control system blind when the camera fails to function correctly.

In current systems, when the primary sensing device fails, the vehicle's lateral control system is disabled requiring the driver to take immediate action to control the vehicle's steering. However, studies relating semi-autonomous or autonomous driving reveal that there may be a delay for the driver to take over the vehicle steering control (e.g., 1-2 seconds or more). A delay in the driver's response time could be a concern if the driver is occupied with non-driving activities and does not immediately respond (e.g., collision with side traffic due to lane departure of the host vehicle). Thus, there is a need for a robust lateral control system that is able to alert the driver and maintain control of the vehicle for a reasonable period of time giving the driver an opportunity to regain control of the vehicle.

SUMMARY

In accordance with the teachings of the present invention, a vehicle lateral control system is disclosed that includes a lane marker module configured to determine a heading and displacement of a vehicle in response to images received from a secondary sensing device, a lane information fusion module configured to generate vehicle and lane information in response to data received from heterogeneous vehicle sensors and a lane controller configured to generate a collision free vehicle path in response to the vehicle and lane information from the lane information fusion module and an object map.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a vehicle lateral control system is merely exemplary in nature, and is in no way intended to limit the invention or its applications or uses.

The vehicle lateral control system presented herein is configured to utilize sensors already deployed within a vehicle to estimate lane information so that the vehicle can operate in a graceful degradation mode if the vehicle's primary lane sensing device is obstructed or otherwise fails. In one embodiment, lane estimation information may include, but is not limited to, lateral lane offset, vehicle orientation with respect to the lane from rear-view camera, lane geometry from a digital map and leading vehicle trajectories.

Figure 1:
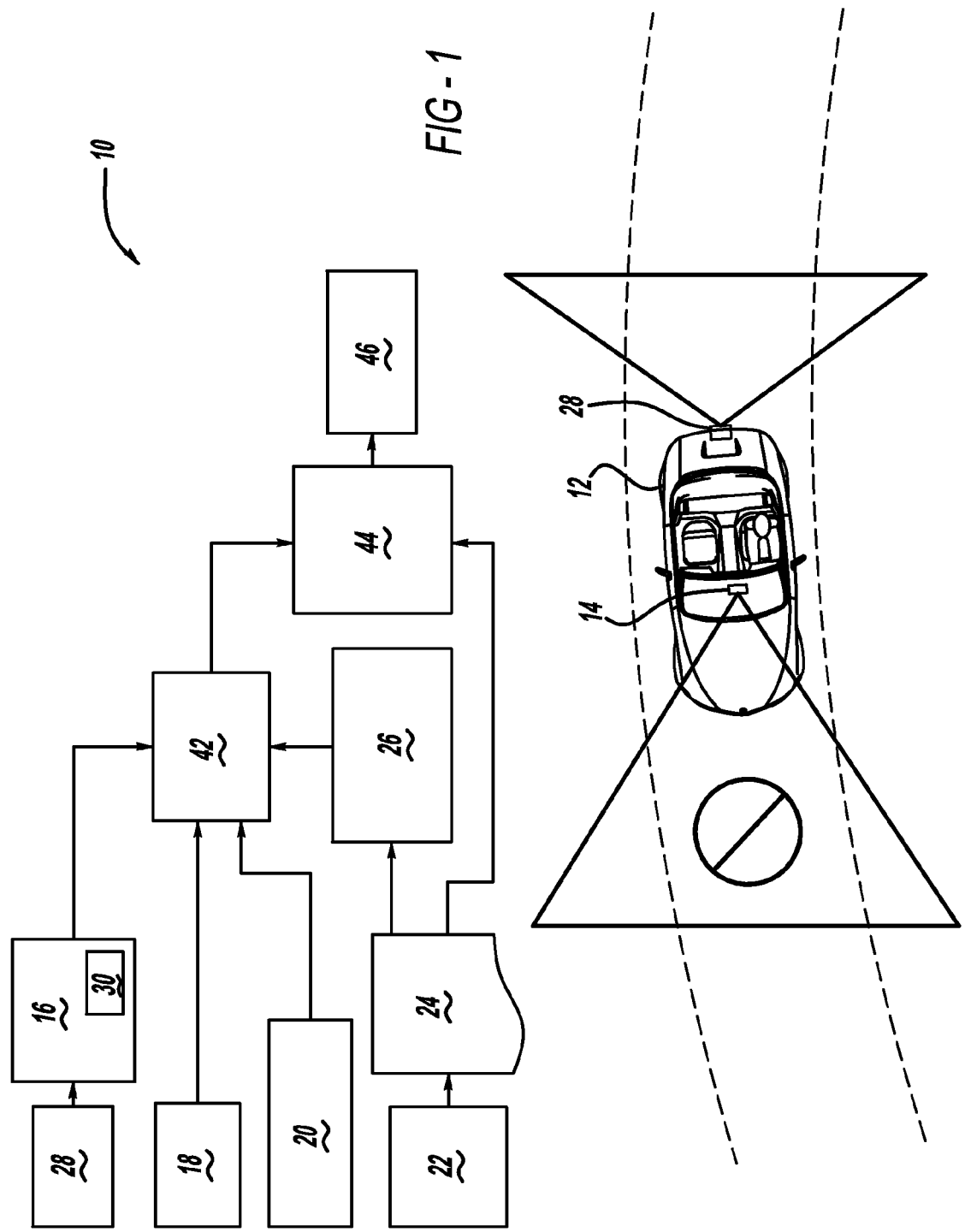
FIG. 1 is a block diagram of a vehicle lateral control system, according to an embodiment of the present invention.

FIG. 1 is a block diagram of a vehicle lateral control system 10 configured to provide limited vehicle stability control when a primary lateral control sensing device on a vehicle 12, such as a forward looking camera 14, is obstructed or otherwise fails. As discussed in detail below, the control system 10 combines both vehicle dynamics and kinematics to improve the vehicle's stability control and path tracking performance. Various vehicle sensors are used to provide dynamic vehicle control, including a yaw rate sensor, a lateral acceleration sensor and a vehicle speed sensor. Kinematic vehicle control is provided by one or more of a vision system, a radar system and/or a map data base with a GPS sensor. The vehicle dynamics control controls the vehicle yaw rate and/or side-slip (rate), while the vehicle kinematics control controls vehicle path and/or lane tracking.

The vehicle lateral control system 10 shown in FIG. 1 includes a lane marker extraction and fitting module 16, a global positioning system (GPS) module 18, a plurality of vehicle dynamics sensors 20 and a plurality of object detection sensors 22. The GPS module 18 is configured to estimate the lane curvature and heading of the vehicle based on the vehicle's position on a static digital map that is stored in the GPS module 18. The vehicle dynamics sensors 20 are used to determine the vehicle's speed and yaw rate, and the inputs from the object detection sensors, which are mounted to the host vehicle, are used to build an object map 24 that identifies both dynamic and static objects. Using the object map 24, a leading vehicle trajectory estimator 26 is configured to monitor target vehicles in front of the host vehicle 12 with non-zero ground speed. The leading vehicle trajectory estimator 26 builds a historical position trajectory of the target vehicles, and then estimates the forward lane curvature and heading based on the trajectory information. An exemplary system and method for deriving lane curvature and heading using the static digital map stored in the GPS module 18, and the leading vehicle trajectory estimator 26 using the object map 24, are disclosed in U.S. application Ser. No. 12/688,965, filed Jan. 18, 2010, entitled "System and method of lane path estimation using sensor fusion," which is incorporated herein by reference in its entirety.

The lane marker extraction and fitting module 16, also referred to as the lane marker module, is configured to estimate the heading and displacement of the vehicle using a video stream from a secondary sensing device such as a rear-view camera 28. The lane marker extraction and fitting module 16 includes a lane and curb detection algorithm 30 that monitors the video stream of the rear-view camera 28 and identifies landmarks based on the intensity and geometry of the shapes detected in the image. The pixels defining the shapes are rectified (i.e., radial distortion removed) and then projected into a vehicle frame coordinate system. A curve fitting method is then employed to estimate the heading and displacement of the vehicle with respect to the center line of the lane.

Figure 2:
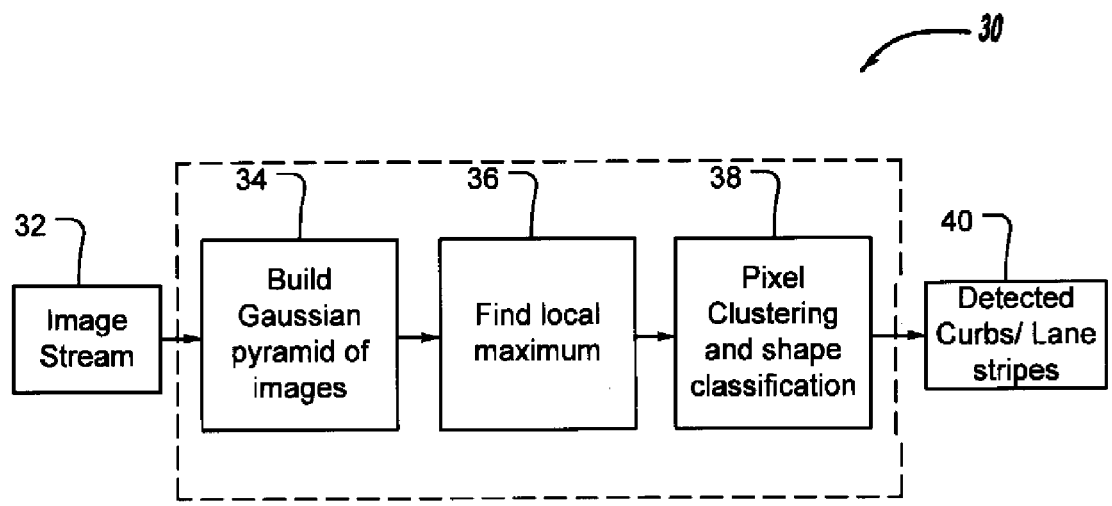
FIG. 2 is a flowchart illustrating an exemplary lane and curb detection algorithm according to the system shown in FIG. 1.

FIG. 2 is a flowchart illustrating an exemplary lane and curb detection algorithm 30 for processing images received by the rear-view camera 28. At step 32, images from the rear-view camera 28 are fed into the lane marker extraction and fitting module 16. In one embodiment, the lane and curb detection algorithm 30 uses a known image processing technique referred to as the pyramid method, and in particular, the Gaussian pyramid method. This technique involves creating a series of images that are weighted using a Gaussian average (i.e., Gaussian Blur) and scaled down. When this technique is used multiple times, it creates a stack of successively smaller images, with each pixel containing a local average that corresponds to a pixel neighborhood on a lower level of the pyramid. Using this approach, the primary objective of lane detection is to find a stable local high-intensity region using different spatial scales.

At step 34, a Gaussian pyramid is built such that at each pyramid scale, the original image is subtracted by an enlarged coarse level image, which is further blurred to reduce image noise and detail. As an example, let the image at scale l be $f_l(r, c)$. The next scale $f_{l+1}(r, c)$ is the half size of $f_l(r, c)$. Let G ($\sigma$, H) be a Gaussian kernel where $\sigma$ is the standard deviation, and H specifies the number of rows and columns in the convolution kernel G. Then the process can be expressed as $$d_l(r,c) = G*f_l(r,c) - \text{resize}(G*f_{l+1}(r,c), 2)$$

where the operator resize (f,2) enlarges the image f twice as large as f.

At step 36, a local maximum, or local high intensity region, is determined for each scale. Accordingly, all maxima having a height that is less than a predetermined threshold h is suppressed. The binary images of possible lane markers are derived such that the final image of the detected lane markers includes only pixels that are local maxima at all pyramid scales.

Figure 3:
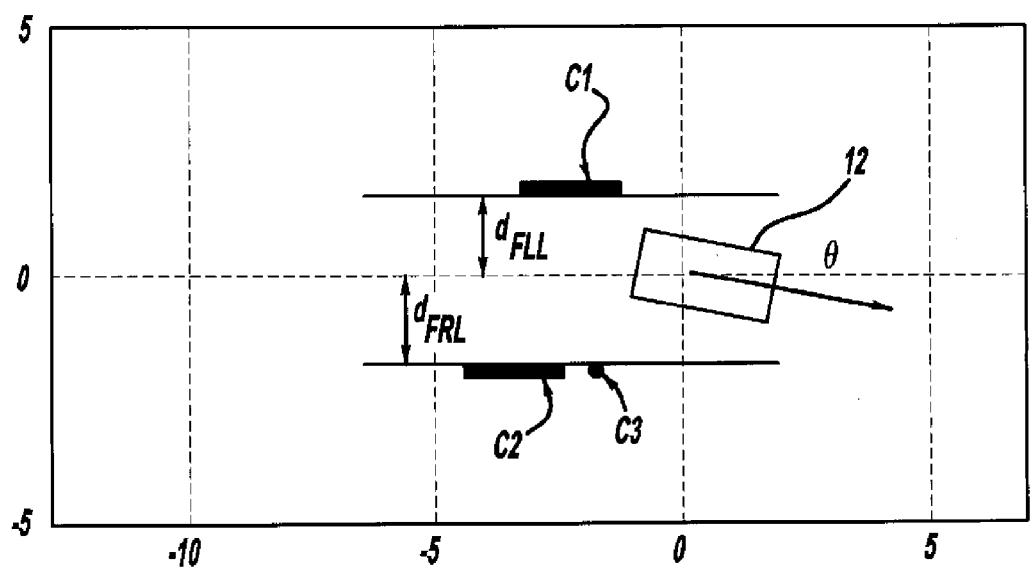
FIG. 3 illustrates exemplary lane marker pixel clusters projected onto a vehicle frame coordinate system.

At step 38, algorithm 30 performs a pixel clustering and shape classification operation and projects the clustered lane marker pixels into a vehicle frame coordinate system. In one embodiment, pixels are clustered using an affinity measure based on a pair-wise distance between pixels. For example, two pixels belong to the same cluster if the distance between two pixels is less than a predetermined threshold d. FIG. 3 illustrates exemplary lane marker pixel clusters C1, C2 and C3 that are projected into the vehicle frame. The clustering operation further computes the geometric shape of each pixel cluster using known techniques. Only clusters with an elongated shape (e.g., clusters C1 and C2 in FIG. 3) are classified as potential lane stripes.

Next, at step 40, a curve fitting technique is applied to estimate the heading and displacement of the vehicle with respect to the center line of the lane. Let $(x_i, y_i)$, $i=1, \ldots, N$ be pixels in a detected stripe, such as clusters C1 or C2 in FIG. 3. In one embodiment, the stripes can be fit by a line parametric equation, e.g., $Ax+By=d$, such that $A^2+B^2=1$. The parameters A, B and d can be estimated via least-squares by minimizing the function, $$\|X\beta\|^2, X = \begin{pmatrix} x_1 & y_1 & 1 \\ x_2 & y_2 & 1 \\ \vdots & \vdots & \vdots \\ x_N & y_N & 1 \end{pmatrix}, \beta = \begin{pmatrix} A \\ B \\ d \end{pmatrix}$$

which can be solved by finding the eigenvector of X with smallest eigen value. Therefore, if the cluster corresponds to the lane marker on the host vehicle's 12 left side, then the displacement to the left lane boundary $d_{FLL}$ can be computed according to the following equation.

$$d_{FLL} = d/\sqrt{A^2+B^2}$$

The vehicle heading $\theta_L$ with respect to the lane path tangent may be computed as follows.

$$\theta_L = \arctan\frac{A}{B}$$

Similarly, if the cluster corresponds to the lane marker on the host vehicle's right side, then the displacement to right lane boundary $d_{FRL}$ can be computed as according to the following equation.

$$d_{FRL} = d/\sqrt{A^2+B^2}$$

The vehicle heading $\theta_R$ with respect to the lane path tangent may be computed as follows.

$$\theta_R = \arctan\frac{A}{B}$$

If lane markers on both sides of the vehicle are detected, then the vehicle heading with respect to lane path tangent can be computed as, $$\theta = w_L \theta_L + w_R \theta_R$$

where $\theta_L$ and $\theta_R$ are vehicle headings derived by left and right lane markers, respectively, $w_L$ and $w_R$ are normalized weights (summed to 1) that are a function of the length of the detected lane stripes.

Referring back to FIG. 1, the vehicle lateral control system 10 further includes a lane information fusion module 42 that is configured to generate degraded lane information by fusing data from the lane marker extraction and fitting module 16, the GPS module 18, the vehicle dynamics sensors 20 and the leading vehicle trajectory estimator 26. The lane information is converted to a common format such as the same format typically output by the forward looking camera 14. In other words, the lane information fusion module 42 is configured to merge data from a plurality of sources and convert the data into a particular format.

Figure 4:
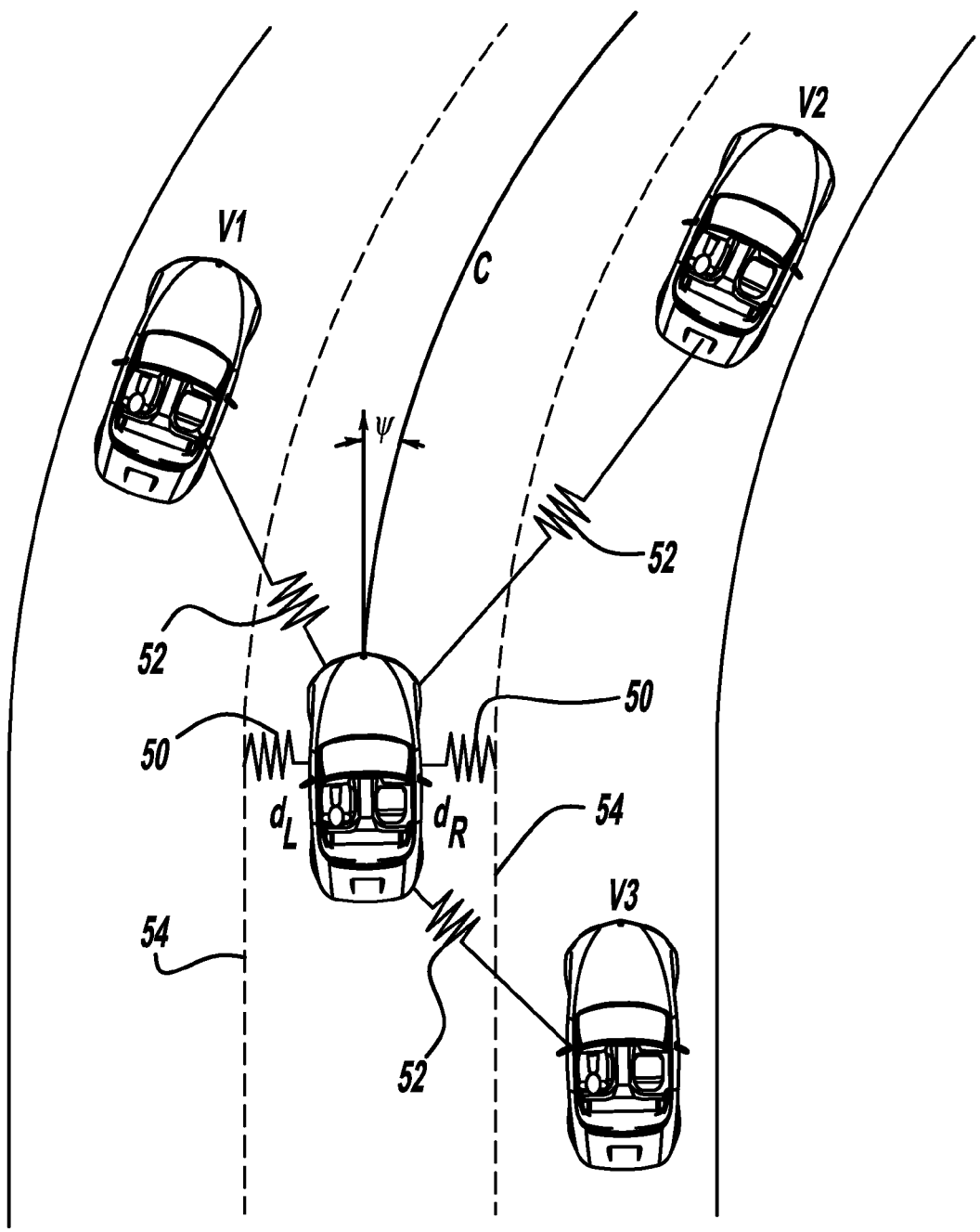
FIG. 4 illustrates the concept of an enhanced artificial potential field according to an embodiment of the invention.

In one embodiment, a Kalman filter technique is used to fuse data from heterogeneous sensors such as the digital map from the GPS module 18, the rear-view camera 28, the vehicle dynamics sensors 20, the objects sensors 22 through the leading vehicle trajectory estimator 26 and the forward-view camera 14, which provides historical data before the failure. Referring to FIG. 4, the fusion module 42 outputs a lane curvature (c), the host vehicle's 12 heading (ψ) with respect to the lane's tangent, and displacements from the left and right lane boundaries at current vehicle location ($d_L$ and $d_R$).

The digital map database provides a list of waypoints (i.e., coordinates that identify a point in physical space) transformed to the local vehicle coordinate frame. These points represent the forward lane geometry (e.g., straight road vs. curved road). A cubic spline function f(s) is obtained to fit the waypoints, and a corresponding curvature function $k_M(s)$ and lane heading function $\xi_M$ with respect to the host vehicle 12 can be computed where s denotes the longitudinal arc length from the vehicle.

Measurements from the rear-view camera 28 are denoted as θ (vehicle heading), $d_{FLL}$ (displacement to left lane boundary) and $d_{FRL}$ (displacement to right lane boundary), as shown in FIG. 3. The measurements from the vehicle dynamic sensors 20 are denoted as $\omega_H$ (host vehicle yaw rate) and $v_H$ (host vehicle speed), the estimation from leading vehicle trajectories are denoted as $\theta_T$ (vehicle heading), the lane curvature as $k_T(s)$ and the measurement of forward-view camera 14 as a curvature function $k_F(s)$. The fusion output c (lane curvature) can be computed as $$c = w_M k_M(0) + w_T k_T(0) + w_F k_F(\Delta s)$$

where $w_M$, $w_T$ and $w_F$ are normalized weights (summed to 1) that represent the quality of the estimates from different sources (i.e., digital map, leading vehicle trajectory, and previous measurement of the forward-view camera) and $\Delta s$ is the distance traveled by the host vehicle since the forward-view camera is down. In one example, these weights are determined by heuristic rules such as $w_m$ is comparably large if GPS data accuracy is good and residue of digital map matching is small, $w_T$ is comparably large if the number of leading vehicles sufficient and $w_F$ decays as the $\Delta s$ gets bigger.

Let the state vector be defined as the vector $(\psi, d_L, d_R)^T$ modeling the host vehicle's 12 heading with respect to the lane's tangent, the displacement to the left lane boundary, and the displacement to the right lane boundary at current location, respectively. The process equations of the Kalman filter can be written as $$d_L' = d_L - v_H \sin\psi \Delta T + u_{dL}$$

$$d_R' = d_R + v_H \sin\psi \Delta T + u_{dR}$$

$$\psi' = \psi - \omega_H \Delta T + c v_H \Delta T + u_\psi$$

where $(d'_L, d'_R, \psi')$ is the predicted state vector, $\Delta T$ is the sample time between two adjacent time instances and $u_{dL}$, $u_{dR}$ and $u_\psi$ are pre-defined variance Gaussian zero-mean white noise. The measurement equations can written as $$\theta = \psi + v_{R\theta}$$

$$d_{FLL} = d_L + v_{RdL}$$

$$d_{FRL} = d_R + v_{RdR}$$

$$\theta_T = \psi + v_T$$

$$\xi_M = \psi + v_M$$

where $v_{R\theta}$, $v_{RdL}$, $v_{RdR}$, $v_T$ and $v_M$ are Gaussian zero-mean white noise whose variance is a function of the quality of the corresponding measurement. The more accurate the quality measurement is, the smaller the variance. Finally, an extended Kalman filter (EKF) is applied to update the state vector, which is the host vehicle's 12 heading (ψ) with respect to the lane's tangent, and displacement from center line of the lane at current vehicle location (d).

Referring once again to FIG. 1, vehicle lateral control system 10 further includes a collision-free virtual lane controller 44 configured to monitor the input from the lane information fusion module 42 and the object map 24. The collision-free virtual lane controller 44 generates a vehicle path without imminent collision with objects. Vehicle controls signals, including steering angle control signals and/or braking control signals, consistent with maintaining the collision-free path are then sent to a vehicle lateral actuator 46, which without limitation may include an electrical power steering actuator, an active front steering actuator, a rear-wheel steering assist actuator and/or a differential braking actuator.

Figure 5:
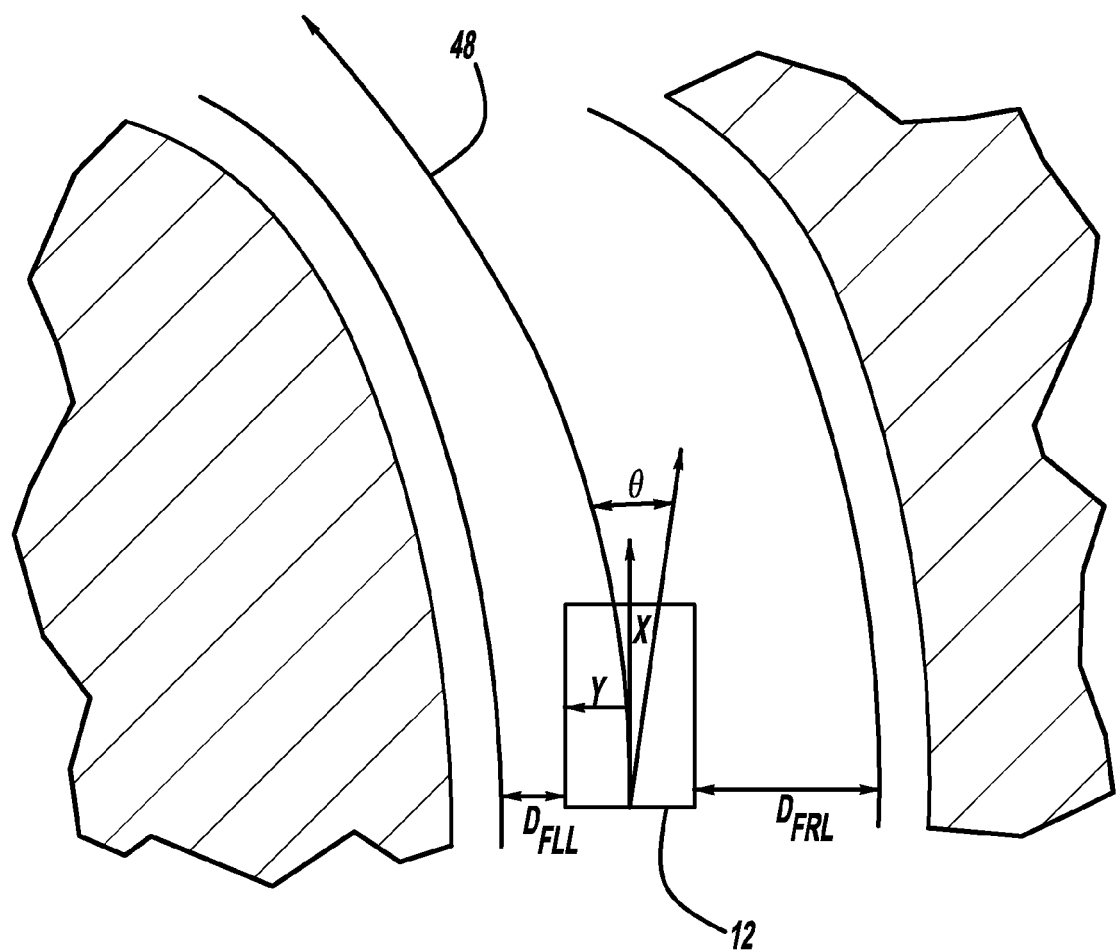
FIG. 5 illustrates a bicycle model of a host vehicle along a collision free virtual lane path.

As shown in FIG. 5, the space surrounding the host vehicle 12 is partitioned into a grid of cells. Each cell is classified as occupied (i.e., marked as 'x' or 'o') or unoccupied (i.e., blank cell). A curved arrow 48 shows the result of the lane information fusion module 42, which is used by the collision-free virtual lane controller 44 to design an artificial potential field around the host vehicle 12. The repulsive force generated by the potential field ensures that the vehicle follows the curve 48 with no imminent collision with overlapping occupied cells. Enforcing the host vehicle 12 to follow the curve 48 from the fusion module 42 may cause undesirable unstable behavior in the vehicle's lateral controller if only the rear-view camera data is available. As a countermeasure, the control strategy disclosed herein is configured to steer the vehicle so that the vehicle stays in the lane with no imminent collision to surrounding objects.

FIG. 4 conceptually illustrates an enhanced artificial potential field concept where repulsive potential fields 50, 52 are constructed on lane boundaries 54 and other objects of interest, such as other vehicles V1, V2 and V3, respectively. The repulsive potential fields 50, 52 are designed based on two inputs, the lane marker geometry information and surrounding objects, each of which are outlined separately below.

The potential field 50 contributed by lane markers 54, provides a repulsive force when the host vehicle is too close to a lane boundary. For example, for the potential field 50 generated by the left lane can be written as $$V_L(d_L) = \begin{cases} k_p d_L^2, & \text{if } d_L < 1.8 \text{ meters} \\ 0, & \text{otherwise.} \end{cases}$$

The potential field 50 generated by the right lane can be written as $$V_R(d_R) = \begin{cases} -k_p d_R^2, & \text{if } d_R < 1.8 \text{ meters} \\ 0, & \text{otherwise.} \end{cases}$$

Predicted lateral displacements, $D_L$ (from the left lane boundary) and $D_R$ (from the right lane boundary) can be used to compute the potential field. The lateral displacements can be computed as $$D_L = d_L - \psi x_{la} - \frac{1}{2}\left(\frac{\omega_H}{v_H} - c\right)x_{la}^2$$

-continued $$D_R = d_R + \psi x_{la} + \frac{1}{2}\left(\frac{\omega_H}{v_H} - c\right)x_{la}^2$$

where $x_{la}$ is a lookahead distance, c is the lane curvature and ψ is the vehicle heading with respect to lane tangent. The lookahead distance $x_{la}$ creates a gain on the host heading, and is necessary for stability at high speeds. It can be chosen to give a comfortable driver feel.

A target vehicle is considered to provide a potential field 52 when the target vehicles V1, V2 and V3 are in the same lane or adjacent lanes of the host vehicle 12, when the longitudinal displacement from the host vehicle 12 is within a predetermined threshold (e.g., 8 meters), or when a time-to-collision (TTC) with an approaching vehicle is less than a threshold (e.g., 2 seconds). In one embodiment, the TTC is determined by dividing the longitudinal displacement by the relative longitudinal velocity.

To calculate the potential field 52, let $d_{T_i}$ denote the lateral displacement of the i-th selected target vehicle. With reference to FIG. 4, there are three displacements $d_{T_1}$, $d_{T_2}$ and $d_{T_3}$, corresponding to the target vehicles V1, V2, and V3, respectively, and $D_{T_j}$ is the lateral displacement from the host vehicle at $x_{T_j}$ (the shortest path to the estimated lane path from fusion module 42). The potential field 52 can be written as $$V_{T_i} = \begin{cases} \text{sign}(D_{T_i})k_t D_{T_i}^2, & \text{if } 1.8 < |D_{T_i}| < 5.4 \text{ meters} \\ 0, & \text{otherwise.} \end{cases}$$

where the sign function is defined as $$\text{sign}(x) = \begin{cases} 1, & \text{if } x \geq 0 \\ -1, & \text{otherwise.} \end{cases}$$

The combined potential field 50, 52 from the two sources can be written as follows.

$$V = V_L(D_L) + V_R(D_R) + \sum_i V_{T_i}$$

The force applied to the host vehicle 12 is derived from the differential of the potential field $$F = -\frac{\partial V}{\partial y}$$

where y is the lateral position of the host vehicle. Therefore, the steering angle that will be sent to actuator 46 (e.g., Electrical Power Steering (EPS) or Active Front Steering (AFS)) can be computed as $$\delta_f = -\frac{F}{C_f}$$

where $C_f$ is the front cornering stiffness.

Figure 6:
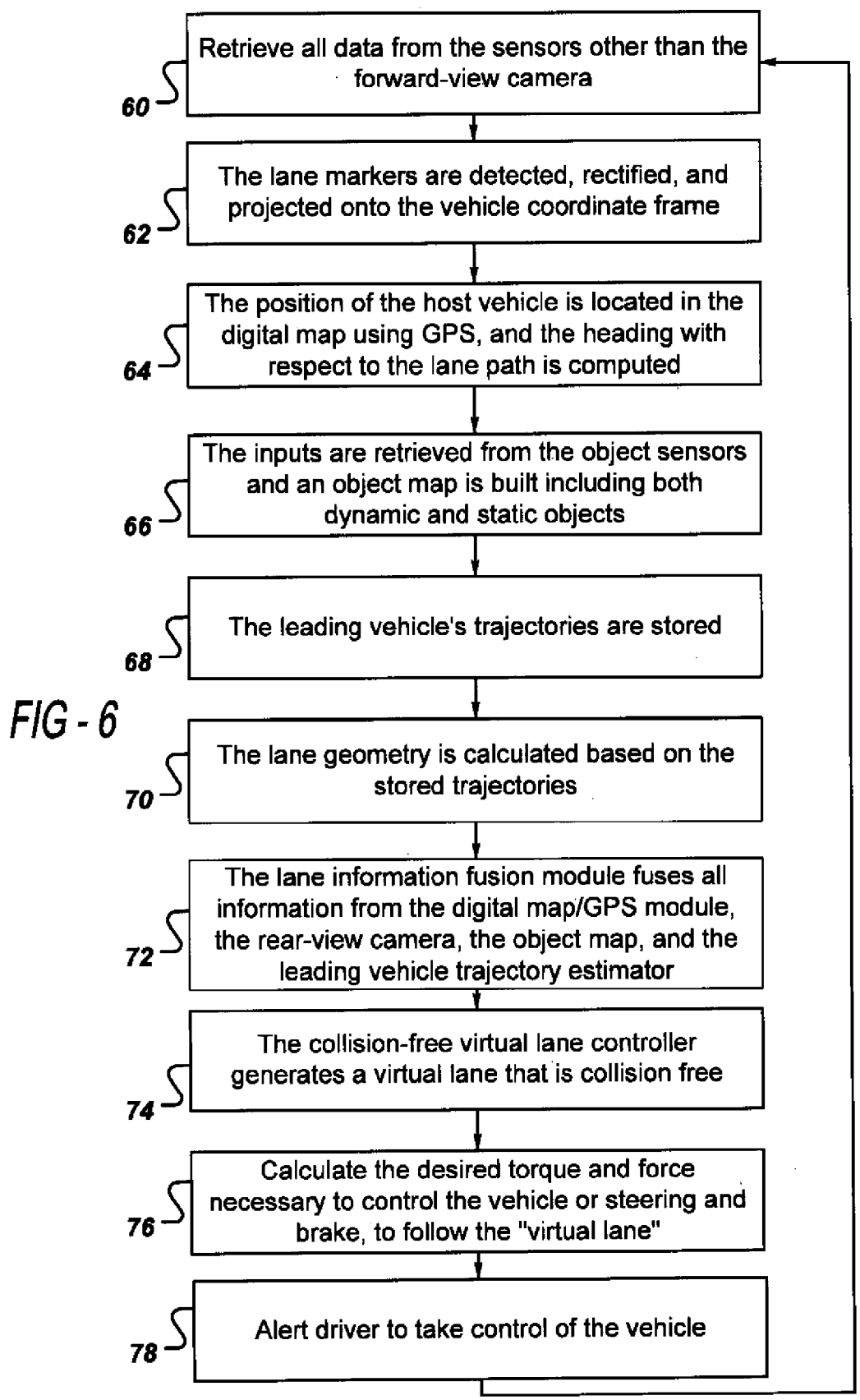
FIG. 6 is a flowchart illustrating an exemplary method for implementing the data processing associated with the vehicle lateral control system of FIG. 1.

FIG. 6 is a flowchart illustrating an exemplary method for processing the data associated with the vehicle lateral control system 10 as described above. At step 60, the system 10 retrieves all data from the sensors other than the forward-view camera 14, such as the rear-view camera 28, the digital map in the GPS module 18, the vehicle dynamics sensors 20 and the object detection sensors 22. At step 62, the lane markers are detected, rectified, and projected onto the vehicle coordinate frame. The detected lane markers are fit into a parametric form including the host vehicle's 12 heading with respect to lane path's tangent and displacements to the left and right lane boundaries. At step 64, the position of the host vehicle is located in the digital map using GPS, and the heading with respect to lane path's tangent and the curvature of the lane path is computed. At step 66, the inputs are retrieved from the object sensors and an object map is built including both dynamic and static objects. At step 68, the leading vehicle's trajectories are stored, and at step 70, the lane geometry is calculated based on the stored trajectories. At step 72, the lane information fusion module 42 fuses all information gathered from the digital map/GPS module 18, the rear-view camera 28, the object map 24, and the leading vehicle trajectory estimator 26. At step 74, the collision-free virtual lane controller 44 generates a virtual lane that is collision free using the enhanced artificial potential technique described above. At step 76, the desired torque and force necessary to control the vehicle steering and/or brake is calculated in the vehicle lateral actuator 46 to follow the "virtual lane" having a lane curvature c At step 78, the driver is alerted that the system 10 is operating in degradation mode and prompts the driver to take over control of the vehicle 12.

The system described herein may be implemented on one or more suitable computing devices, which generally include applications that may be software applications tangibly embodied as a set of computer-executable instructions on a computer readable medium within the computing device. The computing device may be any one of a number of computing devices, such as a personal computer, processor, handheld computing device, etc.

Computing devices generally each include instructions executable by one or more devices such as those listed above. Computer-executable instructions may be compiled or interpreted from computer programs created using a variety of programming languages and/or technologies, including without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable media includes any medium that participates in providing data (e.g., instructions), which may be read by a computing device such as a computer. Such a medium may take many forms, including, but not limited to, non-volatile media, volatile media, and transmission media. Non-volatile media includes, for example, optical or magnetic disks and other persistent memory. Volatile media include dynamic random access memory (DRAM), which typically constitutes a main memory. Common forms of computer-readable media include any medium from which a computer can read.

It is to be understood that the above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that further developments will occur in the arts discussed herein, and that the disclosed systems and methods will be incorporated into such further examples. In sum, it should be understood that the invention is capable of modification and variation and is limited only by the following claims.

The present embodiments have been particular shown and described, which are merely illustrative of the best modes. It should be understood by those skilled in the art that various alternatives to the embodiments described herein may be employed in practicing the claims without departing from the spirit and scope of the invention and that the method and system within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable construction and their ordinary meaning as understood by those skilled in the art unless an explicit indication to the contrary is made herein. In particular, use of the singular articles such as "a", "the", "said", etc. should be read to recite one or more of the indicated elements unless a claim recites an explicit limitation to the contrary.

What is claimed is:

1. A vehicle lateral control system, comprising:
   a primary sensing device controlling a vehicle lateral movement;
   a lane marker module configured to determine a heading and displacement of a vehicle in response to images received from a secondary sensing device;
   a lane information fusion module configured to generate vehicle and lane information in response to data received from heterogeneous vehicle sensors, wherein the data received from the heterogeneous vehicle sensors includes a digital map database from a global positioning system module; and
   a lane controller configured to detect a failure in the primary sensing device and to generate a collision free vehicle path in response to the vehicle and lane information from the lane information fusion module and an object map, said controller controlling the vehicle lateral movement by following the collision free vehicle path, and alerting a vehicle driver to take control of steering the vehicle.

2. The system according to claim 1 wherein the secondary sensing device is a rear-view camera.

3. The system according to claim 1 wherein the digital map database includes a list of waypoints that represent a forward lane geometry.

4. The system according to claim 1 wherein data received from heterogeneous vehicle sensors includes the images received from the secondary sensing device.

5. The system according to claim 4 wherein the images received from the secondary sensing device are rectified and projected to a vehicle frame coordinate system to estimate the vehicle's heading and displacement with respect to a center line of the lane.

6. The system according to claim 1 wherein the lane marker module includes an algorithm configured to detect lane markers in the images received by the secondary sensing device.

7. The system according to claim 6 wherein the algorithm is configured to perform a pixel clustering and shape classification operation to isolate the pixel clusters that are potential lane stripes.

8. The system according to claim 6 wherein the lane markers include curbs and lane stripes.

9. The system according to claim 1 wherein data received from heterogeneous vehicle sensors includes data received from a plurality of vehicle dynamics sensors.

10. The system according to claim 1 wherein data received from heterogeneous vehicle sensors includes data received from a leading vehicle trajectory estimator that is configured to build a historical position trajectory of target vehicles and estimate the lane curvature and heading in response to the dynamic and static object map.

11. The system according to claim 1 wherein the object map includes dynamic and static objects detected by a plurality of object sensors mounted to the vehicle.

12. The system according to claim 1 further comprising an actuator responsive to signals from the lane controller, wherein the actuator is selected from a group consisting of an electrical power steering actuator, an active front steering actuator, a rear-wheel steering assist actuator and/or a differential braking actuator.

13. The system according to claim 1 where the lane controller generates the collision free vehicle path using calculations for an artificial potential repulsion field acting on the vehicle from objects that the vehicle could collide with.

* * * * *